US006672846B2

United States Patent
Rajendran et al.

(10) Patent No.: US 6,672,846 B2
(45) Date of Patent: Jan. 6, 2004

(54) CAPACITY MODULATION FOR PLURAL COMPRESSORS

(75) Inventors: Rajan Rajendran, Centerville, OH (US); John P. Sheridan, Tipp City, OH (US); Carl H. Knapke, Maplewood, OH (US)

(73) Assignee: Copeland Corporation, Sidney, OH (US)

( * ) Notice: Subject to any disclaimer, the term of this patent is extended or adjusted under 35 U.S.C. 154(b) by 0 days.

(21) Appl. No.: 09/842,349

(22) Filed: Apr. 25, 2001

(65) Prior Publication Data

US 2002/0159898 A1 Oct. 31, 2002

(51) Int. Cl.[7] .................................................. F04B 17/00
(52) U.S. Cl. ...................... 417/410.5; 417/426; 418/55.1
(58) Field of Search ............................. 417/410.5, 287, 417/286, 426, 429, 212; 418/60, 55.1

(56) References Cited

U.S. PATENT DOCUMENTS

| 4,105,374 A | 8/1978 | Scharf |
| 4,205,537 A | 6/1980 | Dubberley |
| 4,252,506 A | 2/1981 | Hannibal |
| 4,277,955 A | 7/1981 | Parker |
| 4,358,254 A | 11/1982 | Hannibal |
| 4,396,360 A | 8/1983 | Elson |
| 4,515,539 A | 5/1985 | Morishita |
| 5,211,031 A | 5/1993 | Murayama et al. ...... 417/410.5 |
| 5,328,344 A | 7/1994 | Sato et al. |
| 5,385,453 A | 1/1995 | Fogt et al. |
| 5,800,141 A * | 9/1998 | Ceylan et al. ............. 418/55.1 |
| 6,193,473 B1 | 2/2001 | Mruk et al. |
| 6,206,652 B1 * | 3/2001 | Caillat ..................... 417/222.1 |
| 6,213,731 B1 * | 4/2001 | Doepker et al. ............ 417/310 |
| 6,267,572 B1 * | 7/2001 | Suefuji et al. ........... 417/410.5 |
| 6,280,154 B1 * | 8/2001 | Clendenin et al. ....... 417/410.5 |

FOREIGN PATENT DOCUMENTS

| JP | 56165701 A | * 12/1981 | ................... 418/60 |
| JP | 5738690 A | * 3/1982 | ................... 418/60 |
| JP | 0294987 A | * 11/1989 | ................... 418/60 |
| JP | 04121474 A | * 4/1992 | ................... 418/60 |
| JP | 404203489 A | * 7/1992 | ................... 418/60 |

* cited by examiner

*Primary Examiner*—Cheryl J. Tyler
(74) *Attorney, Agent, or Firm*—Harness, Dickey & Pierce, P.L.C.

(57) ABSTRACT

A compressor system includes a pair of compressors located in a common shell. A common drive shaft drives both compressors and the drive shaft is powered by a single motor. One or both of the compressors can be equipped with a pulse width modulated capacity control system and a vapor injection system. When one compressor is equipped with these systems, the capacity can be varied between 50% and 110%. When both compressors are equipped with these systems, the capacity can be varied between 0% and 120%.

41 Claims, 7 Drawing Sheets

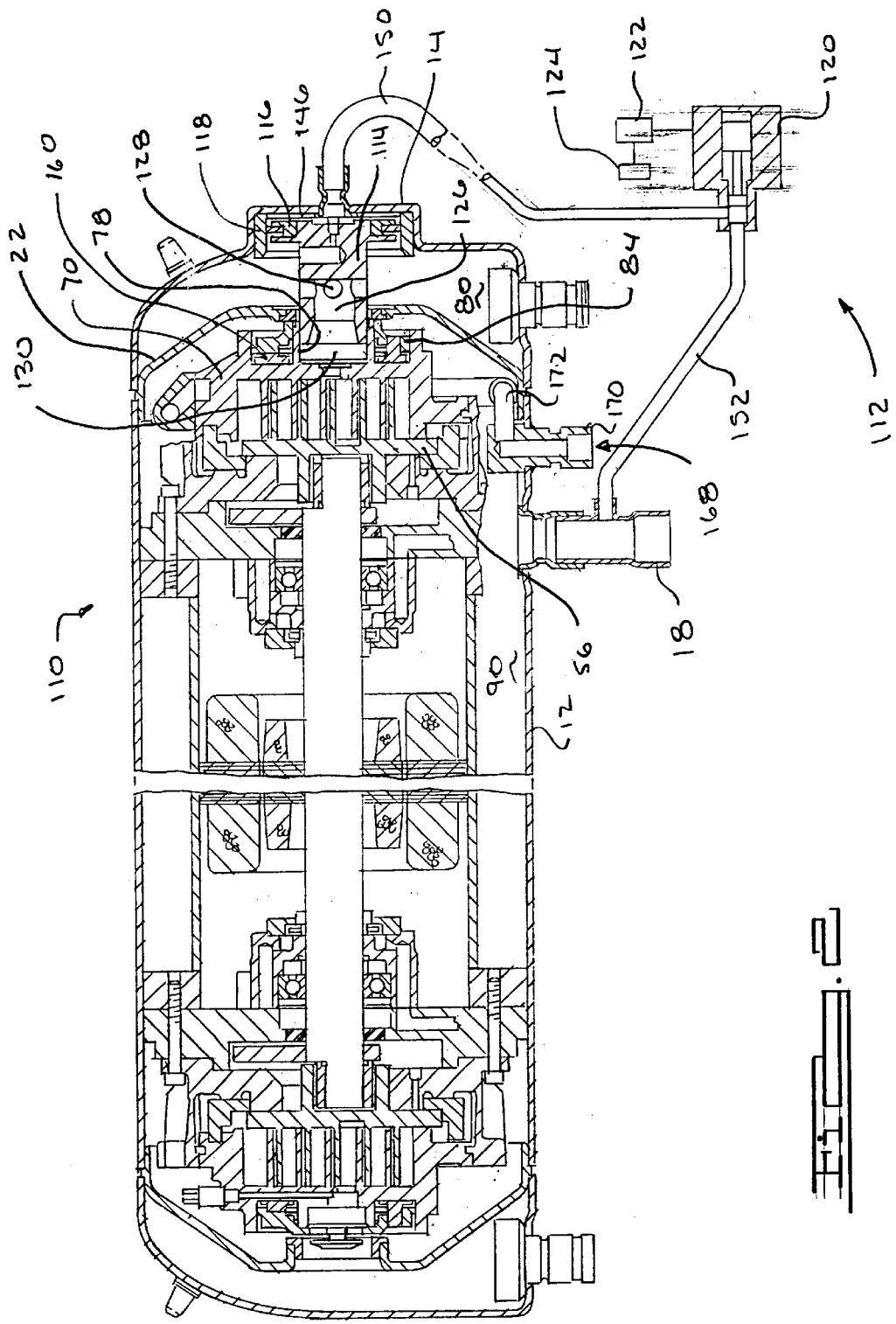

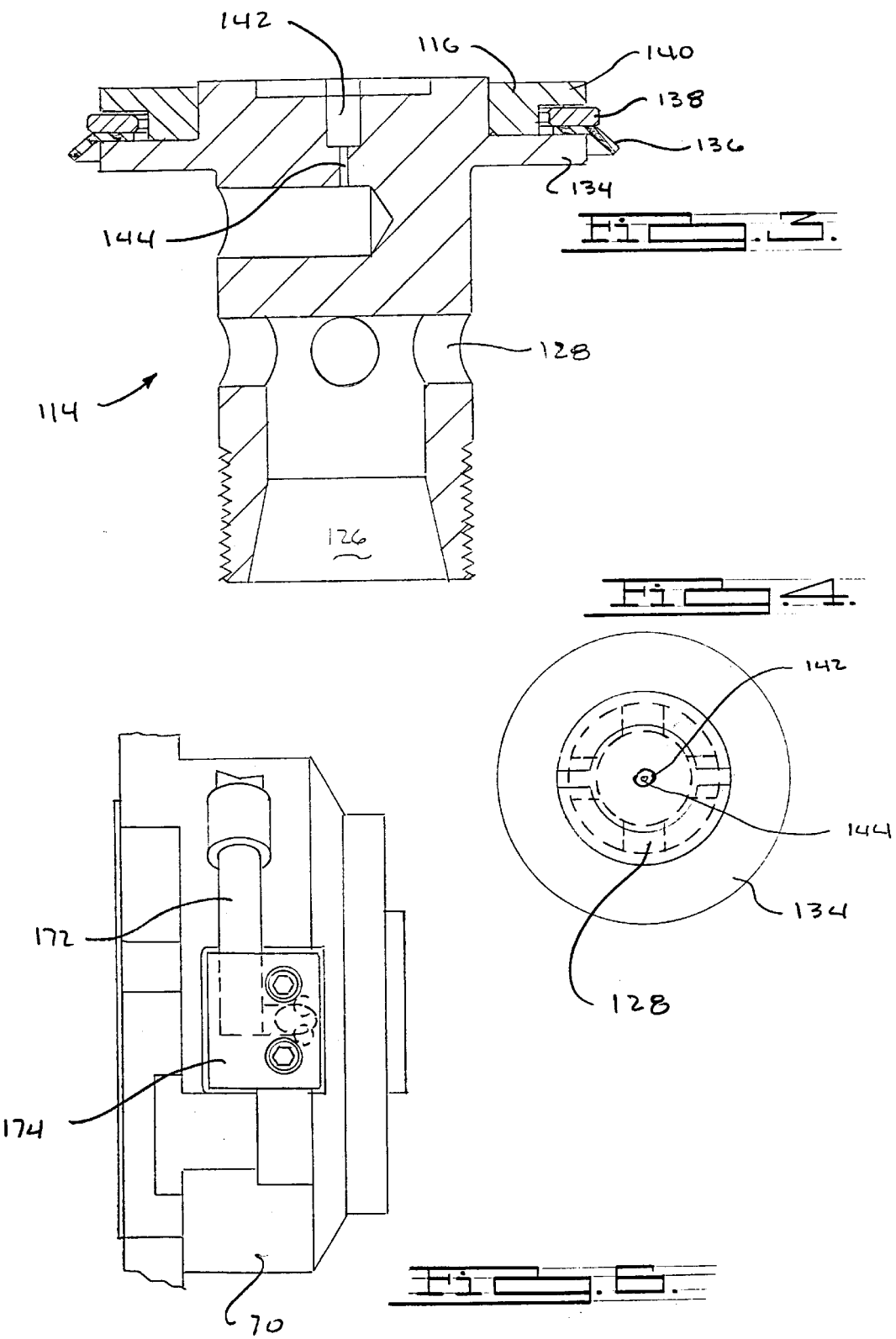

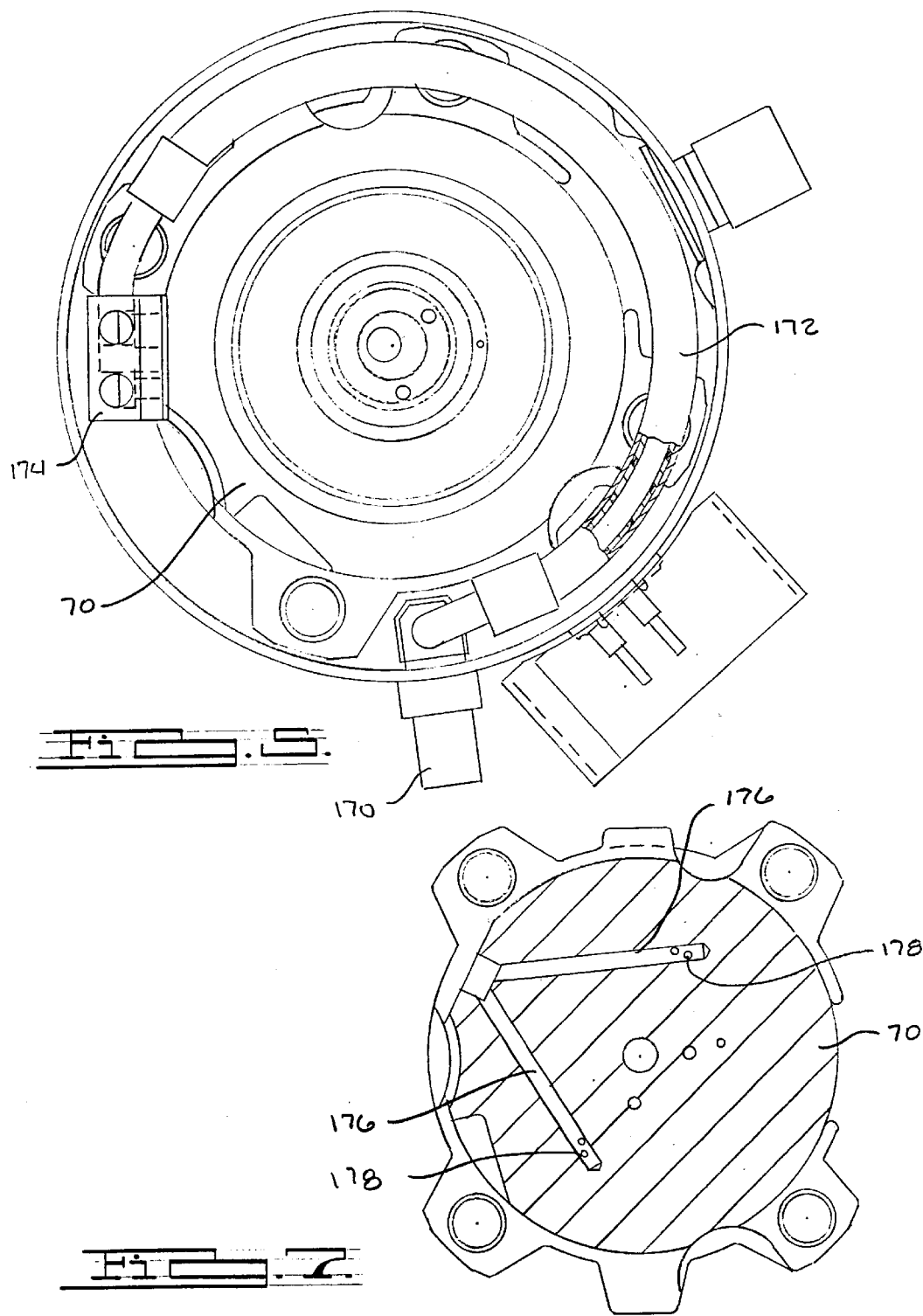

CAPACITY MODULATION FOR PLURAL COMPRESSORS

FIELD OF THE INVENTION

The present invention relates to plural compressors disposed within a single shell. More particularly, the present invention relates to plural compressors disposed within a single shell which are driven by the same motor.

BACKGROUND OF THE INVENTION

Due to energy cost and conservation, there is a demand for refrigerant motor-compressor units which have an output which can be varied in accordance with demand. To satisfy this demand, many different systems have been proposed. One such system involves the unloading of one or more cylinders in a multi-cylinder compressor or the varying of re-expansion volume for the purpose of varying the output of the compressor system. These systems tend to be relatively complex and the efficiency of the compressor system in the unloaded state is not optimum. Variable speed compressors have also been used, but they require expensive controls and also the speed control and motor-compressor efficiency present some efficiency issues at least when operating in a reduced output condition.

Compressor systems have also been developed which, in place of a single compressor large enough to carry the maximum load, include a plurality of smaller motor-compressors having a combined output equal to the required maximum. These multi-compressor systems include means for controlling the total system in such a manner as to selectively activate and deactivate less than all of the compressors when it is desired to vary the output. These multi-compressor units have good efficiency but they require complex hook-up plumbing, including means for dealing with lubricating oil management in order to ensure that all the oil remains equally distributed between each of the compressors.

Further development of the multi-compressor systems has included the incorporation of a plurality of standard motor compressor units in a common shell. The common shell maximizes the compactness of the system and provides a common oil sump for equal oil distribution, a common suction gas inlet and a common discharge gas outlet. These single shell multi-compressor units have proved to be acceptable in the marketplace but they tend to be relatively large and the means for controlling the total system is still somewhat complex.

The continued development of multi-compressor systems has been directed towards reducing the overall costs and the overall size as well as simplifying the control systems which dictate the output quantity of these systems.

The present invention provides the art with a dual compressor system with one compressor being located at opposite ends of a common drive shaft. A motor rotor is press fit to the center portion of the drive shaft and the motor rotor is disposed within a motor stator. Thus, both compressors are powered by the same motor. The control of the output of the dual compressor system is accomplished by a variable speed motor or by a pulsed width modulation (PWM) capacity control system incorporated into one or both of the two compressors. When incorporating a variable speed motor for capacity control, the capacity can be varied from 0% to 100%. When incorporating the PWM capacity control system into one of the compressors, the capacity can be varied from 50% to 100%. When incorporating the PWM capacity control system into both compressors, the capacity can be varied from 0% to 100%. The capacity of one or both of the compressors can be increased to approximately 120% of capacity using vapor injection to increase the range of the dual compressor system if desired.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a vertical cross sectional view of the motor compressor system shown in FIG. 1 with one of the two compressors incorporating pulse width modulation capacity control in accordance with the present invention;

FIG. 3 is an enlarged section view of the piston assembly shown in FIG. 2;

FIG. 4 is a top view of the discharge fitting shown in FIG. 3;

FIG. 5 is an end section view of the compressor shown in FIG. 2;

FIG. 6 is a side view of one of the non-orbiting scroll members shown in FIG. 2;

FIG. 7 is a cross sectional top view of the non-orbiting scroll member shown in FIG. 6;

DETAILED DESCRIPTION OF THE PREFERRED EMBODIMENTS

The following description of the preferred embodiment(s) is merely exemplary in nature and is in no way intended to limit the invention, its application, or uses.

Figure 1:
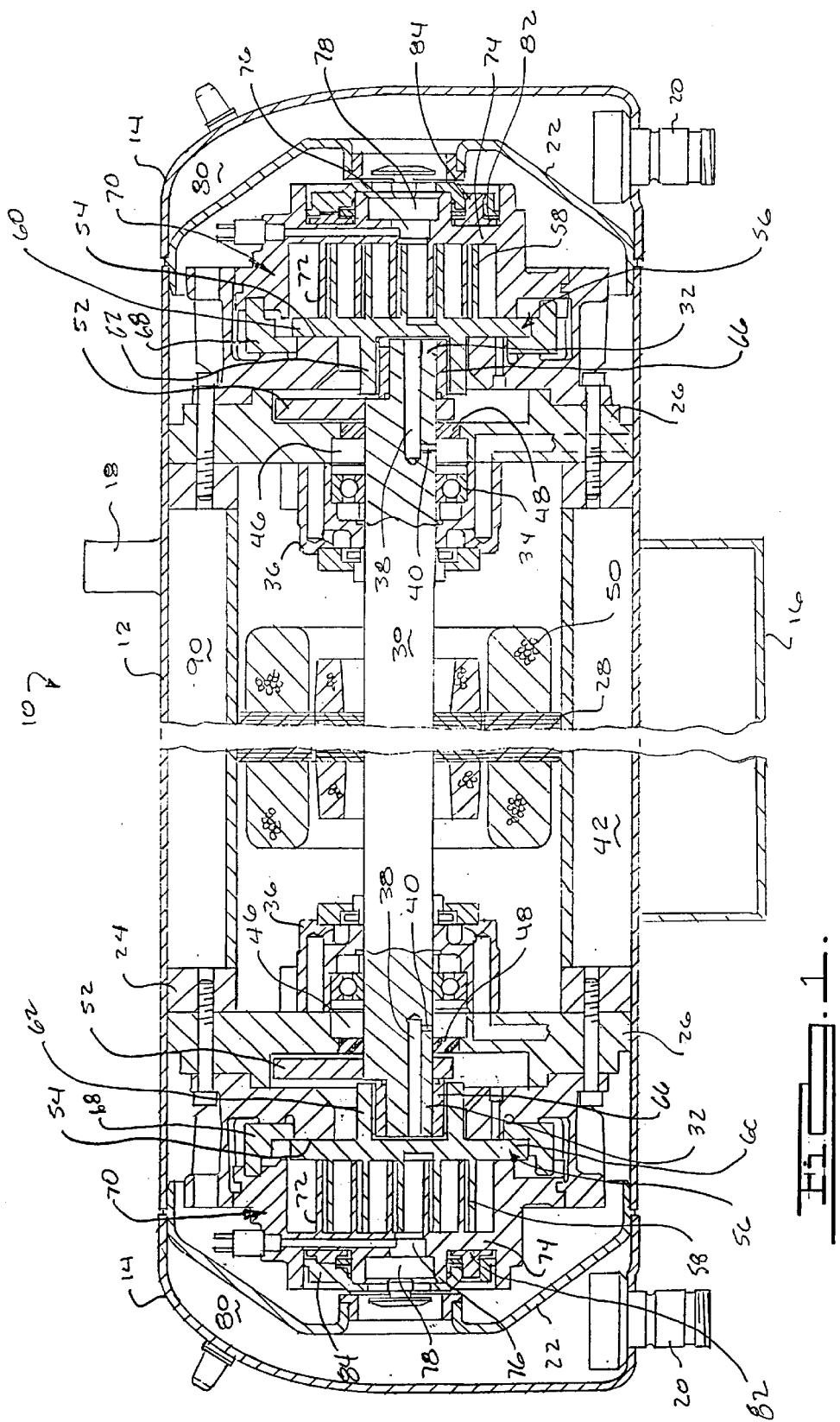
FIG. 1 is a vertical cross sectional view through a motor-compressor system in accordance with the present invention.

Referring now to the drawings in which like reference numerals designate like or corresponding parts throughout the several views, there is shown in FIG. 1 a multi-compressor compression system in accordance with the present invention which is designated generally by the reference numeral 10. Compression system 10 comprises a generally cylindrical hermetic shell 12 having welded at each end thereof an end cap 14 and at the central portion thereof a base 16. Shell 12 is provided with a suction inlet fitting 18 and each cap 14 is provided with a refrigerant discharge fitting 20 which may have the usual discharge valve therein. A transversely extending partition 22 is affixed to each end of shell 12 by being welded about their periphery at the same point that each end cap 14 is welded to shell 12. A compressor mounting frame 24 is press fit within shell 12.

Major elements of compression system 10 that are affixed to frame 24 include a pair of two piece main bearing assemblies 26 and a motor stator 28. A drive shaft or crankshaft 30 having a pair of eccentric crank pins 32 at opposite ends thereof is rotatably journaled in a pair of bearings 34 each secured within an oil pump 36 secured to a respective main bearing assembly 26. Crankshaft 30 has at each end thereof an axially extending bore 38 which communicates with a respective radial extending bore 40 to provide lubricating oil to the moving components of compressor system 10. The lower portion of shell 12 defines an oil sump 42 which is filled with lubricating oil to a level slightly above the lower end of a rotor 44. Each oil pump 36 draws oil from oil sump 42 and pumps the oil into a chamber 46 defined by oil pump 36 and main bearing assembly 26. A seal 48 seals each chamber 46 and a drain port (not shown) maintains the oil level within chamber 46. Oil from chamber 46 flows through radial bore 40 into axial extending bore 38 and to the moving components of compressor system 10 which require lubrication.

Crankshaft 30 is rotatably driven by an electric motor which includes stator 28, windings 50 passing therethrough and rotor 44 press fitted on crankshaft 30. A pair of counterweights 52 are secured to opposite ends of crankshaft 30 adjacent a respective crank pin 32.

The upper surface of each two-piece main bearing assembly 26 is provided with a flat thrust bearing surface 54 on which is disposed a respective orbiting scroll member 56 having the usual spiral vane or wrap 58 extending outwardly from an end plate 60. Projecting outwardly from the lower surface of each end plate 60 of each orbiting scroll member 56 is a cylindrical hub 62 having a journal bearing therein and in which is rotatively disposed a drive bushing 66 having an inner bore in which a respective crank pin 32 is drivingly disposed. Each crank pin 32 has a flat on one surface which drivingly engages a flat surface formed in a portion of the inner bore of each drive bushing 66 to provide a radially compliant driving arrangement, such as shown in Assignee's U.S. Pat. No. 4,877,382, the disclosure of which is hereby incorporated herein by reference. A pair of Oldham couplings 68 is also provided positioned between each orbiting scroll member 56 and each two-piece bearing housing assembly 26. Each Oldham coupling 68 is keyed to a respective orbiting scroll member 56 and to a respective non-orbiting scroll member 70 to prevent rotation of a respective orbiting scroll member 56.

Each non-orbiting scroll member 70 is also provided with a wrap 72 extending outwardly from an end plate 74 which is positioned in meshing engagement with a respective wrap 58 of a respective orbiting scroll member 56. Each non-orbiting scroll member 70 has a centrally disposed discharge passage 76 which communicates with a centrally open recess 78 which is in turn in fluid communication with a respective discharge pressure chamber 80 defined by each end cap 14 and each partition 22. An annular recess 82 is also formed in each non-orbiting scroll member 70 within which is disposed a respective floating seal assembly 84.

Recesses 78 and 82 and floating seal assemblies 84 cooperate to define axial pressure biasing chambers which receive pressurized fluid being compressed by respective wraps 58 and 72 so as to exert an axial biasing force on a respective non-orbiting scroll member 70 to thereby urge the tips of respective wraps 58 and 72 into sealing engagement with the opposed end plate surfaces of end plates 74 and 60, respectively. Floating seal assemblies 84 are preferably of the type described in greater detail in Assignee's U.S. Pat. No. 5,156,539, the disclosure of which is hereby incorporated herein by reference. Non-orbiting scroll members are designed to be mounted for limited axial movement to a respective two-piece main bearing housing assembly 26 in a suitable manner such as disclosed in the aforementioned U.S. Pat. No. 4,877,382 or Assignee's U.S. Pat. No. 5,102,316, the disclosure of which is hereby incorporated herein by reference.

Shell 12 defines a suction pressure chamber 90 which receives a gas for compression from suction gas inlet fitting 18. The gas within suction pressure chamber 90 is taken in at the radially outer portion of both sets of intermeshed scrolls 56 and 70, it is compressed by both sets of wraps 58 and 72 and it is discharged into a respective discharge pressure zone 80 through discharge passage 76 and recesses 78. The compressed gas exits each discharge pressure zone 80 through respective discharge fittings 20. Tubing (not shown) secured to each discharge fitting combine gas from both discharge fittings 20 to a common tube (not shown) which is then piped to the apparatus utilizing the compressed gas.

When it is desired to incorporate a capacity control system into compression system 10, the electric motor can be designed as a variable speed motor. The design for the variable speed motor which includes stator 28, windings 50 and rotor 44 are well known in the art and will not be discussed in detail. By providing variable speed capacity to the electric motor, the capacity of compressor 10 can be varied between 0% and 100%.

Referring now to FIG. 2, there is shown a compressor system which includes a unique capacity control system in accordance with another embodiment of the present invention and which is designated generally by the reference numeral 110. Compressor system 110 is the same as compressor system 10, except that one pair of scrolls 56 and 70 incorporate a capacity control system 112.

Control system 112 includes a discharge fitting 114, a piston 116, a shell fitting 118, a solenoid valve 120, a control module 122 and a sensor array 124 having one or more appropriate sensors. Discharge fitting 114 is threadingly received or otherwise secured within open recess 78. Discharge fitting 114 defines an internal cavity 126 and a plurality of discharge passages 128. A discharge valve 130 is disposed below fitting 114 and below cavity 126. Thus, pressurized gas overcomes the biasing load of discharge valve 130 to open discharge valve 130 and allowing the pressurized gas to flow into cavity 126, through passages 128 and into discharge pressure chamber 80.

Referring now to FIGS. 2, 3 and 4, the assembly of discharge fitting 114 and piston 116 is shown in greater detail. Discharge fitting 114 defines an annular flange 134. Seated against flange 134 is a lip seal 136 and a floating retainer 138. Piston 116 is press fit or otherwise secured to discharge fitting 114 and piston 116 defines an annular flange 140 which sandwiches seal 136 and retainer 138 between flange 140 and flange 134. Discharge fitting 114 defines a passageway 142 and an orifice 144 which extends through discharge fitting 114 to fluidically connect discharge pressure chamber 80 with a pressure chamber 146 defined by discharge fitting 114, piston 116, seal 136, retainer 138 and end cap 14. Shell fitting 118 is secured within a bore defined by end cap 14 and slidingly receives the assembly of discharge fitting 114, piston 116, seal 136 and retainer 138.

Pressure chamber 146 is fluidically connected to solenoid valve 120 by tube 150 and with suction fitting 18 and thus suction pressure chamber 90 through a tube 152. The combination of piston 116, seal 136 and floating retainer 138 provides a self-centering sealing system to provide accurate alignment with the internal bore of shell fitting 118. Seal 136 and floating retainer 138 include sufficient radial compliance such that any misalignment between the internal bore of shell fitting 118 and the internal bore of open recess 78 within which discharge fitting 114 is secured is accommodated by seal 136 and floating retainer 138.

In order to bias non-orbiting scroll member 70 into sealing engagement with orbiting scroll member 56 for normal full load operation, solenoid valve 120 is deactivated (or it is activated) by control module 122 in response to sensor array 124 to block fluid flow between tubes 150 and tube 152. In this position, chamber 146 is in communication with discharge pressure chamber 80 through passageway 142 and orifice 144. The pressurized fluid at discharge pressure within chambers 80 and 146 will act against opposite sides of piston 16 thus allowing for the normal biasing of non-orbiting scroll member 70 towards orbiting scroll member 56 to sealingly engage the axial ends of each scroll member with the respective end plate of the opposite scroll member. The axial sealing of the two scroll members 56 and 70 causes compressor system 110 to operate at 100% capacity.

In order to unload compressor system 110, solenoid valve 120 will be actuated (or it will be deactuated) by control module 122 in response to sensor array 124. When solenoid valve 120 is actuated (or unactuated), suction pressure chamber 90 is in direct communication with chamber 146 through suction fitting 18, tube 152, solenoid valve 120 and tube 150. With the discharge pressure pressurized fluid released to suction from chamber 146, the pressure difference on opposite sides of piston 116 will move non-orbiting scroll member 70 to the right as shown in FIG. 2 to separate the axial end of the tips of each scroll member with its respective end plate and the higher pressurized pockets will bleed to the lower pressurized pockets and eventually to suction pressure chamber 90. Orifice 144 is incorporated to control the flow of discharge gas between discharge pressure chamber 80 and chamber 146. Thus, when chamber 146 is connected to the suction side of the compressor, the pressure difference on opposite sides of piston 116 will be created. A wave spring 160 is incorporated to maintain the sealing relationship between floating seal assembly 84 and partition 22 during modulation of non-orbiting scroll member 70. When a gap is created between the two scroll members 56 and 70, the continued compression of the suction gas will be eliminated. When this unloading occurs, discharge valve 130 will 2 move to its closed position thereby preventing the backflow of high pressurized fluid from discharge pressure chamber 80 or the downstream refrigeration system. When compression of the suction gas is to be resumed, solenoid valve 120 will be deactuated (or it will be actuated) to again block fluid flow between tubes 150 and 152 allowing chamber 146 to be pressurized by discharge pressure chamber 80 through passageway 142 and orifice 144.

Control module 122 is in communication with sensor array 124 to provide the required information for control module 122 to determine the degree of unloading required for the particular conditions of the refrigeration system including compressor system 110 existing at that time. Based upon this information, control module 122 will operate solenoid valve 120 in a pulsed width modulation mode to alternately place chamber 146 in communication with discharge pressure chamber 80 and suction pressure chamber 90. The frequency with which solenoid valve 120 is operated in the pulsed width modulated mode will determine the percent capacity of operation of one set of scrolls 56 and 70 of compressor system 110. As the sensed conditions change, control module 122 will vary the frequency of operation for solenoid valve 120 and thus the relative time periods at which one set of scrolls 56 and 70 of compressor system 110 is operated in a loaded and unloaded condition. The varying of the frequency of operation of solenoid valve 120 can cause the operation of one set of scrolls 56 and 70 between fully loaded or 100% capacity and completely unloaded or 0% capacity or at any of an infinite number of settings in between in response to system demands. This has the effect of varying the capacity of compressor system 110 between 50% and 100%.

Referring now to FIGS. 5, 6 and 7, a fluid injection system 168 for compressor system 110 is shown in greater detail. Compressor system 110 includes the capability of having fluid injected into the intermediate pressurized moving chambers at a point intermediate suction pressure chamber 90 and discharge pressure chamber 80. A fluid injection fitting 170 extends through shell 12 and is fluidically connected to an injection tube 172 which is in turn fluidically connected to an injection fitting 174 secured to non-orbiting scroll member 70. Non-orbiting scroll member 70 defines a pair of radial passages 176 each of which extend between injection fitting 174 and a pair of axial passages 178. Axial passages 178 are open to the moving chambers on opposite sides of one non-orbiting scroll member 70 of compressor system 110 to inject the fluid into these moving chambers as required by a control system as is well known in the art.

Figure 8:
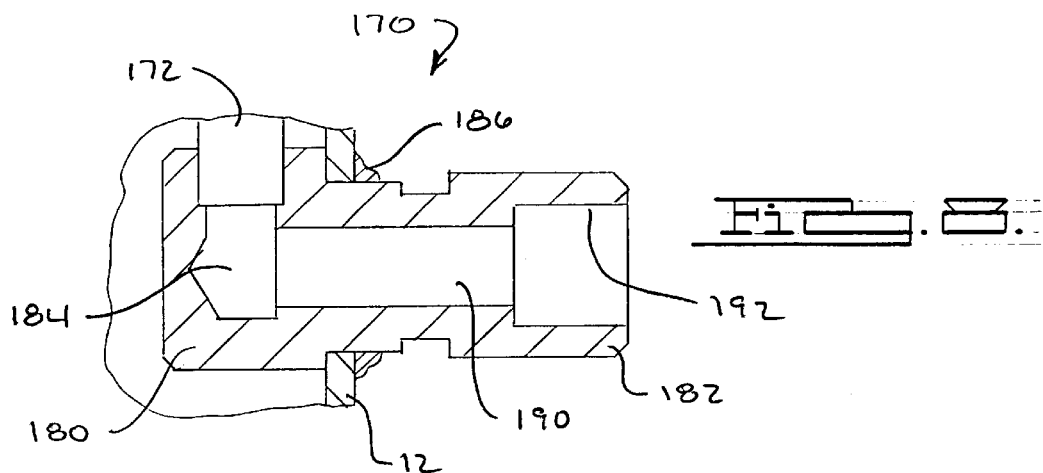
FIG. 8 is an enlarged sectional view of the injection fitting shown in FIG. 2.
Figure 9:
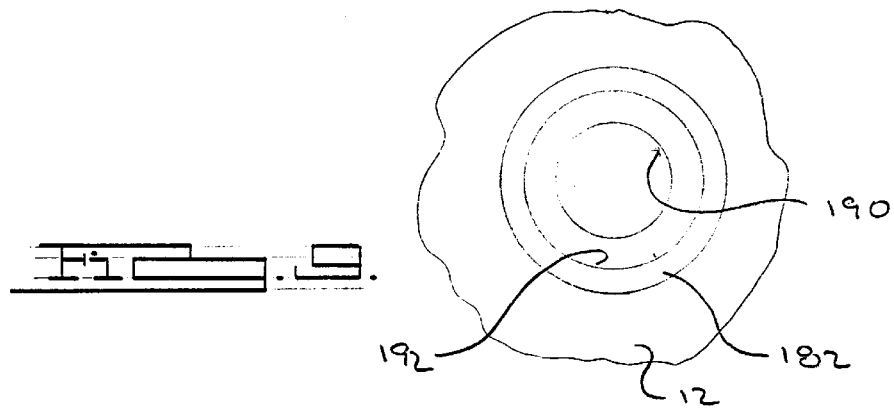
FIG. 9 is an end view of the fitting showing in FIG. 8.

Referring now to FIGS. 8 and 9, fitting 170 is shown in greater detail. Fitting 170 comprises an internal portion 180, and an external portion 182. Internal portion 180 includes an L-shaped passage 184 which sealingly receives injection tube 172 at one end. External portion 182 extends from the outside of shell 12 to the inside of shell 12 where it is unitary or integral with internal portion 180. A welding or brazing attachment 186 secures and seals fitting 170 to shell 12. External portion 182 defines a bore 190 which is an extension of L-shaped passage 184. External portion 182 also defines a cylindrical bore 192 to which the tubing of the refrigeration system is secured.

Figure 10:
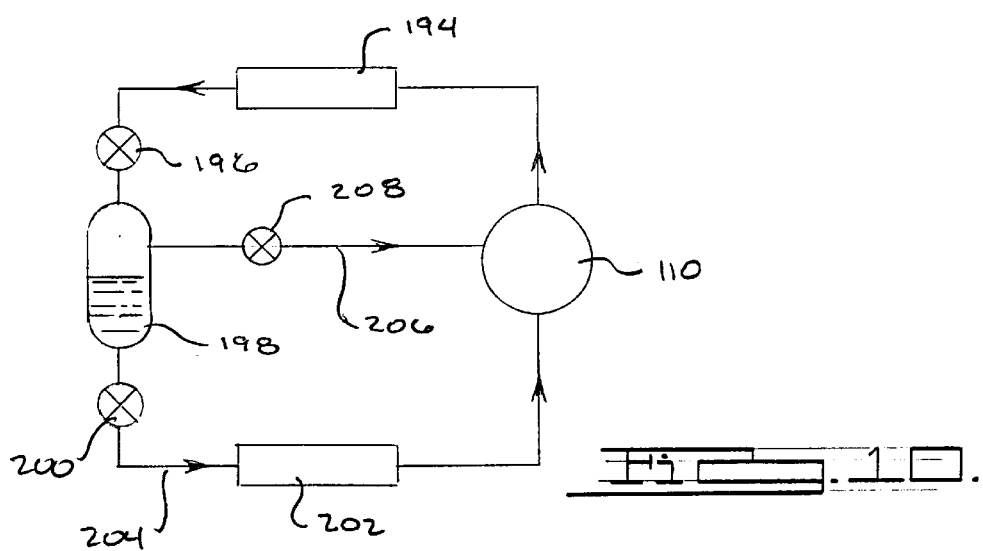
FIG. 10 is a schematic diagram of a refrigerant system utilizing the capacity control system in accordance with the present invention.

FIG. 10 illustrates vapor injection system 168 which provides the fluid for the fluid injection system of compressor system 110. Compressor system 110 is shown in a refrigeration system which includes a condenser 194, a first expansion valve or throttle 196, a flash tank or an economizer 198, a second expansion valve or throttle 200, an evaporator 202 and a series of piping 204 interconnecting the components as shown in FIG. 10. Compressor system 110 is operated by the motor to compress the refrigerant gas. The compressed gas is then liquified by condenser 194. The liquified refrigerant passes through expansion valve 196 and expands in flash tank 198 where it is separated into gas and liquid. The gaseous refrigerant further passes through piping 206 to be introduced into compressor system 110 through fitting 170. On the other hand, the remaining liquid refrigerant further expands in expansion valve 200, is then vaporized in evaporator 202 and is again taken into compressor system 110.

Figure 11:
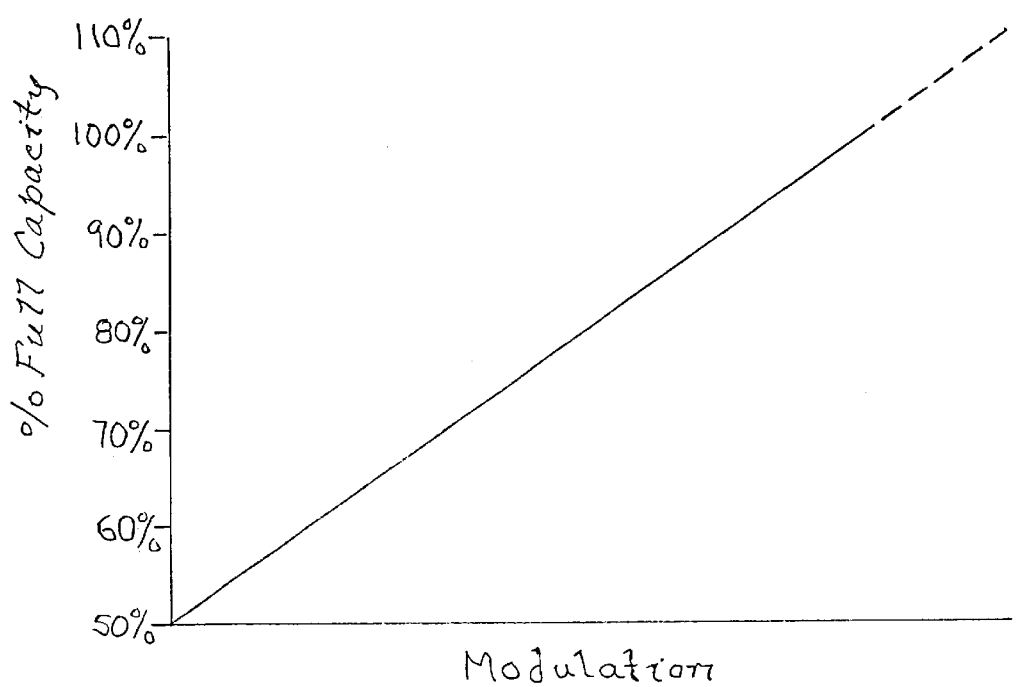
FIG. 11 is a graph showing the capacity of the compressor using the capacity control system in accordance with the present invention.

The incorporation of flash tank 198 and the remainder of vapor injection system 168, allows the capacity of one set of scrolls 56 and 70 of compressor system 110 to increase above the fixed capacity of one set of scrolls 56 and 70 of compressor system 110. Typically, at standard air conditioning conditions, the capacity of one of the scrolls can be increased by approximately 20% to provide one set of the scrolls with 120% of its capacity which is 110% of the capacity of compressor system 110 as shown in the graph in FIG. 11. In order to be able to control the capacity of one set of scrolls 56 and 70 of compressor system 110, a solenoid valve 208 is positioned within piping 206. The amount of percent increase in the capacity of one set of scrolls 58 and 70 of compressor system 110 can be controlled by operating solenoid valve 208 in a pulse width modulation mode. Solenoid valve 208 when operated in a pulse width modulation mode in combination with capacity control system 112 of compressor system 110 allows the capacity of compressor system 110 to be positioned anywhere along the line shown in FIG. 11.

Figure 12:
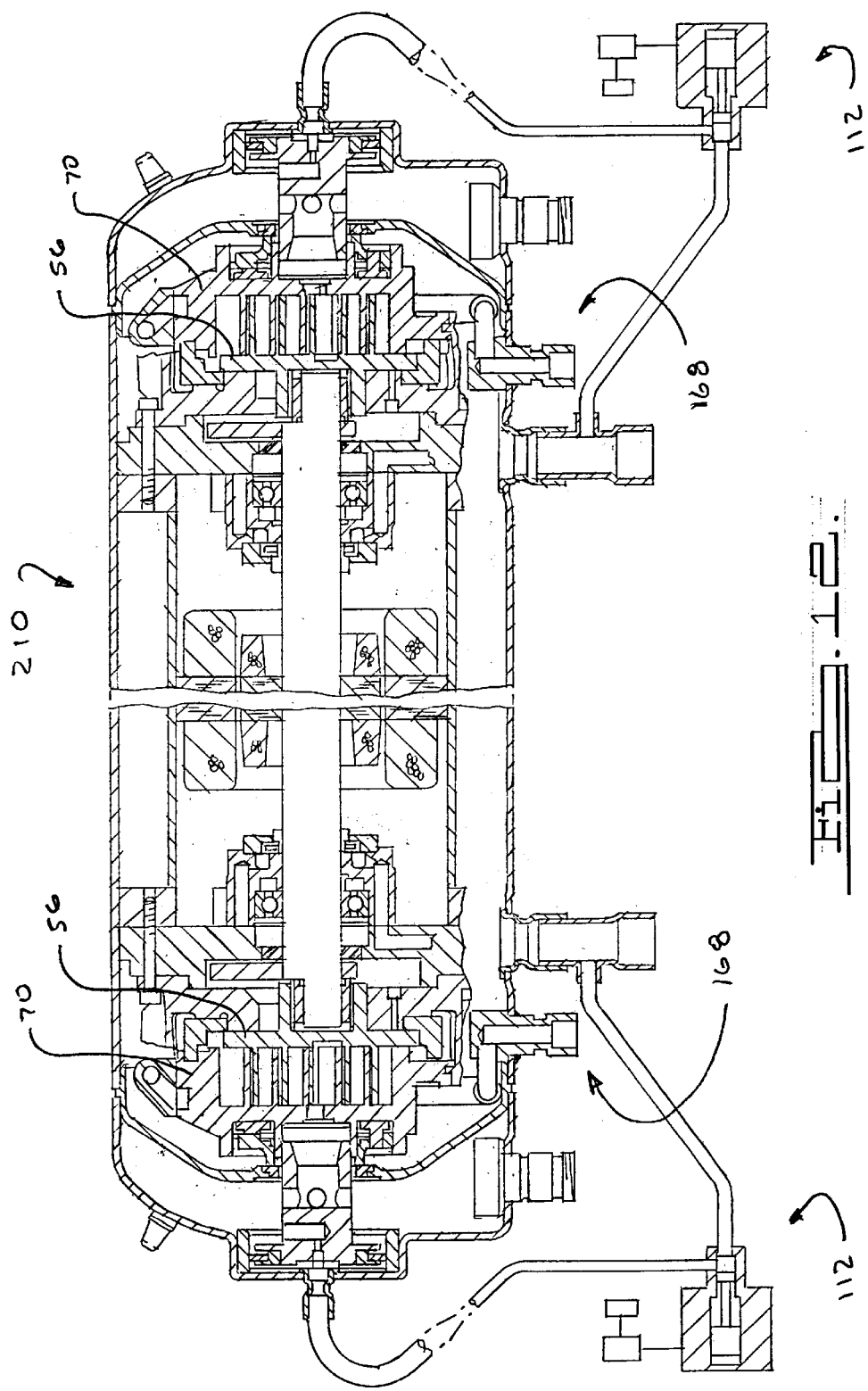
FIG. 12 is a vertical cross sectional view of the motor-compressor system shown in FIG. 1 with both of the two compressors incorporating pulse width modulation capacity control in accordance with the present invention.

Referring now to FIG. 12, there is shown a compressor system which includes a unique capacity control system in accordance with another embodiment of the present invention and which is designated generally by the reference numeral 210. Compressor system 210 is the same as compressor system 110, except that both pairs of scrolls 56 and 70 incorporate both capacity control system 112 and fluid injection system 168. By incorporating capacity control system 112 and fluid injection system 168 into both pairs of scrolls 56 and 70, the capacity of compressor system 210 can be varied from 0% to 120%.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A scroll machine comprising:
   an outer shell defining a suction pressure zone;
   a first scroll compressor disposed within said suction pressure zone of said shell;
   a second scroll compressor disposed within said suction pressure zone of said shell;
   a drive shaft extending between and coupled to each of said first and second scroll compressors said drive shaft operable to drive said first and second scroll compressors for compressing fluid disposed within said suction pressure zone;
   a mounting frame disposed within said suction pressure zone of said shell, said first and second scroll compressors being attached to said mounting frame;
   a motor disposed within said suction pressure zone of said shell between said first and second scroll compressors, said motor being attached to said mounting frame and drivingly coupled to said drive shaft; and
   an oil sump disposed between said outer shell and said mounting frame, said oil sump being in communication with said first scroll compressor through a first bore in said drive shaft and said second scroll compressor through a second bore in said drive shaft.

2. The scroll machine in accordance with claim 1, wherein said motor comprises:
   a stator attached to said mounting frame; and
   a rotor attached to said drive shaft.

3. The scroll machine in accordance with claim 1, wherein said first scroll compressor comprises:
   a first scroll member having a first spiral wrap projecting outwardly from a first end plate;
   a second scroll member having a second spiral wrap projecting outwardly from a second end plate, said second spiral wrap being interleaved with said first spiral wrap to define a first plurality of moving chambers therebetween when said second scroll member orbits with respect to said first scroll member; and
   a first main bearing housing attached to said mounting-frame, said first main bearing housing rotatably supporting said drive shaft.

4. The scroll machine in accordance with claim 3, wherein said mounting frame is disposed between said first main bearing housing and said shell.

5. The scroll machine in accordance with claim 3, wherein said second scroll compressor comprises:
   a third scroll member having a third spiral wrap projecting outwardly from a third end plate;
   a fourth scroll member having a fourth spiral wrap projecting outwardly from a fourth end plate, said fourth spiral wrap being interleaved with said third spiral wrap to define a second plurality of moving chambers therebetween when said fourth scroll member orbits with respect to said third scroll member; and
   a second main bearing housing attached to said mounting frame, said second main bearing housing rotatably supporting said drive shaft.

6. The scroll machine in accordance with claim 5, wherein said mounting frame is disposed between said first main bearing housing and said shell and between said second main bearing housing and said shell.

7. The scroll machine in accordance with claim 1, wherein said shell defines a first discharge pressure chamber in communication with said first scroll compressor and a second discharge chamber in communication with said second scroll compressor.

8. The scroll machine in accordance with claim 7, wherein said first and second scroll compressors are disposed within said suction pressure chamber.

9. The scroll machine in accordance with claim 1, further comprising a first capacity modulation system for varying the capacity of said first scroll compressor.

10. The scroll machine in accordance with claim 9, wherein said first capacity modulation system includes a pulse width modulation system.

11. The scroll machine in accordance with claim 9, further comprising a second capacity modulation system for varying the capacity of said second scroll compressor.

12. The scroll machine in accordance with claim 11, wherein said first capacity modulation system includes a first pulse width modulation system and said second capacity modulation system includes a second pulse width modulation system.

13. The scroll machine in accordance with claim 1, wherein said motor is a variable speed motor.

14. The scroll machine in accordance with claim 1 wherein:
   said first scroll compressor comprises a first non-orbiting scroll member interleaved with a first orbiting scroll member, said first non-orbiting scroll member being mounted for axial movement within said outer shell; and
   said second scroll compressor comprises a second non-orbiting scroll member interleaved with a second orbiting scroll member, said second non-orbiting scroll member being mounted for axial movement within said outer shell.

15. The scroll machine in accordance with claim 1 further comprising a first fluid injection fitting extending through said outer shell for implementing a first vapor injection system for said first scroll compressor.

16. The scroll machine in accordance with claim 15 further comprising a second fluid injection fitting extending through said outer shell for implementing a second vapor injection system for said second scroll compressor.

17. The scroll machine in accordance with claim 16, further comprising a first capacity modulation system for varying the capacity of said first scroll compressor.

18. The scroll machine in accordance with claim 17, wherein said first capacity modulation system includes a pulse width modulation system.

19. The scroll machine in accordance with claim 17, further comprising a second capacity modulation system for varying the capacity of said second scroll compressor.

20. The scroll machine in accordance with claim 19, wherein said first capacity modulation system includes a first pulse width modulation system and said second capacity modulation system includes a second pulse width modulation system.

21. The scroll machine in accordance with claim 15, further comprising a first capacity modulation system for varying the capacity of said first scroll compressor.

22. The scroll machine in accordance with claim 21, wherein said first capacity modulation system includes a pulse width modulation system.

23. The scroll machine in accordance with claim 21, further comprising a second capacity modulation system for varying the capacity of said second scroll compressor.

24. The scroll machine in accordance with claim 23, wherein said first capacity modulation system includes a first pulse width modulation system and said second capacity modulation system includes a second pulse width modulation system.

25. The scroll machine in accordance with claim 1 wherein said drive shaft includes a first eccentric crank pin and a second eccentric crank pin, said first and second crank pin defining a crank pin axis disposed eccentric from an axis of said drive shaft.

26. The scroll machine in accordance with claim 1 wherein a single suction inlet extends through said outer shell, said single suction inlet being in communication with said suction pressure zone.

27. The scroll machine in accordance with claim 1 further comprising a first oil pump in communication with said oil sump and said first scroll compressor.

28. The scroll machine in accordance with claim 27 further comprising a second oil pump in communication with said oil sump and said second scroll compressor.

29. The scroll machine in accordance with claim 1 wherein said outer shell comprises a generally cylindrical shell, a first end cap welded to one end of said generally cylindrical shell and a second end cap welded to an opposite end of said generally cylindrical shell.

30. A scroll machine comprising:
    an outer shell defining a suction pressure zone;
    a first scroll compressor disposed within said suction pressure zone of said shell, said first scroll compressor including a first non-orbiting scroll member interleaved with a first orbiting scroll member, said first orbiting scroll member being mounted for radial movement within said outer shell;
    a second scroll compressor disposed within said suction pressure zone of said shell, said second scroll compressor including a second non-orbiting scroll member interleaved with a second orbiting scroll member, said second orbiting scroll member being mounted for radial movement within said outer shell;
    a drive shaft extending between and coupled to each of said first and second orbiting scroll members, said drive shaft operable to drive said first and second scroll compressors for compressing fluid disposed within said suction pressure zone; and
    a motor disposed within said suction pressure zone shell between said first and second scroll compressors, said motor being drivingly coupled to said drive shaft.

31. A scroll machine comprising:
    an outer shell defining a suction pressure zone;
    a first scroll compressor disposed within said suction pressure zone of said shell, said first scroll compressor comprising:
        a first scroll member having a first end plate and a first spiral wrap extending therefrom;
        a second scroll member having a second end plate and a second spiral wrap extending therefrom, said first and second scroll members being positioned with said first and second spiral wraps interleaved with each other;
    a second scroll compressor disposed within said suction pressure zone of said shell, said second scroll compressor comprising;
        a third scroll member having a third end plate and a third spiral wrap extending therefrom;
        a fourth scroll member having a fourth end plate and a fourth spiral wrap extending therefrom, said third and fourth scroll members being positioned with said third and fourth spiral wraps interleaved with each other;
    a drive shaft extending between and coupled to each of said first and third scroll members said drive shaft operable to drive said first and second scroll compressors for compressing fluid disposed within said suction pressure zone;
    said second scroll member being movable between a first relationship in which sealing surfaces of said first and second scroll members are in sealing relationship to close off first fluid pockets and a second relationship wherein at least one of said sealing surfaces of said first and second scroll members are spaced apart to define a first leakage path between said first fluid pockets; and
    a first fluid operated piston secured to said second scroll member, said first fluid operated piston being actuatable to apply a force to said second scroll member to move said second scroll member between said first relationship where said first scroll compressor operates at substantially full capacity and said second relationship where said first scroll compressor operates at substantially zero capacity.

32. The scroll machine according to claim 31, wherein said first fluid operated piston is operated in a time pulsed manner to modulate the capacity of said first scroll compressor.

33. The scroll machine according to claim 31, further comprising a fluid pressure chamber operative to apply said force to said first fluid operated piston.

34. The scroll machine according to claim 33, wherein said force acts in an axial direction.

35. The scroll machine according to claim 34, further comprising a first passage for supplying a pressurized fluid from said first scroll compressor to said pressure chamber.

36. The scroll machine according to claim 35, further comprising a valve for controlling flow through said first passage, said valve being operative to vent said pressurized fluid from said pressure chamber to thereby enable said second scrolls to move between said first and second relationships.

37. The scroll machine according to claim 36, wherein said valve is a solenoid operated valve.

38. The scroll-type machine according to claim 37, wherein said solenoid operated valve is operated in a pulse width modulated mode.

39. The scroll machine according to claim 35, further comprising a second passage for venting said pressurized fluid from said pressure chamber.

40. The scroll machine according to claim 31 wherein said fourth scroll member is movable between a first relationship in which sealing surfaces of said third and fourth scroll members are in sealing relationship to close off second fluid pockets and a second relationship wherein at least one of said sealing surfaces of said third and fourth scroll members are spaced apart to define a second leakage path between said second fluid pockets, and said scroll machine further comprises:

a second fluid operated piston secured to said fourth scroll member, said second fluid operated piston being actuatable to apply a force to said fourth scroll member to move said fourth scroll member between said first relationship where said second scroll compressor operates at substantially full capacity and said second relationship where said second scroll compressor operates at substantially zero capacity.

41. The scroll machine according to claim 40 further comprising:

a first fluid injection fitting extending through said outer shell for implementing a first vapor injection system for said first scroll compressor; and a second fluid injection fitting extending through said outer shell for implementing a second vapor injection system for said second scroll compressor.

* * * * *

UNITED STATES PATENT AND TRADEMARK OFFICE
CERTIFICATE OF CORRECTION

PATENT NO.    : 6,672,846 B2
DATED         : January 6, 2004
INVENTOR(S)   : Rajan Rajendran, John P. Sheridan and Carl H. Knapke It is certified that error appears in the above-identified patent and that said Letters Patent is hereby corrected as shown below:

Column 5,
Line 52, after "will" delete "2".

Column 8,
Lines 33-35, delete "8. The scroll machine in accordance with claim 7, wherein said first and second scroll compressors are disposed within said suction pressure chamber."

Signed and Sealed this

Sixth Day of April, 2004

JON W. DUDAS
*Acting Director of the United States Patent and Trademark Office*